United States Patent [19]
Peters

[11] Patent Number: 5,090,142
[45] Date of Patent: Feb. 25, 1992

[54] SNOWBLOWER AND LAWNMOWER APPARATUS

[76] Inventor: Kerry M. Peters, 8909 Yankee Clipper, Cherry Valley, Ill. 61016

[21] Appl. No.: 751,134

[22] Filed: Aug. 28, 1991

[51] Int. Cl.$^5$ ............................................. E01H 5/09
[52] U.S. Cl. ............................................ 37/243; 37/248; 37/DIG. 3; 56/16.9; 56/DIG. 9; 239/663; 239/670
[58] Field of Search ............... 37/242, 243, 244, 257, 37/DIG. 3, 248; 56/16.9, DIG. 9; 239/289, 663, 670

[56] References Cited

U.S. PATENT DOCUMENTS

| | | | |
|---|---|---|---|
| 2,847,224 | 8/1958 | Stout | 239/663 |
| 3,065,556 | 11/1962 | Kampert | 239/663 X |
| 4,064,679 | 12/1977 | Spinner | 37/243 X |
| 4,104,812 | 8/1978 | Stribiak | 56/Dig. 9 X |
| 4,308,676 | 1/1982 | Doane | 37/243 |
| 4,403,433 | 9/1983 | Smith | 37/243 |
| 4,491,275 | 1/1985 | Holsworth | 239/663 |
| 4,597,203 | 7/1986 | Middleton | 37/243 X |
| 4,898,333 | 2/1990 | Kine et al. | 239/663 X |

Primary Examiner—Randolph A. Reese
Assistant Examiner—Arlen L. Olsen
Attorney, Agent, or Firm—Leon Gilden

[57] ABSTRACT

An attachment arranged for mounting to an associated lawnmower in an operative relationship to include a snowblower housing operative through a plurality of inter-related belts and pulleys to effect rotation of a plurality of impeller blades mounted within the snowblower housing. A drive pulley is mounted to a lower terminal end of the lawnmower motor output shaft to operatively effect the aforenoted rotation of the impeller structure. A modification of the invention includes a granular hopper in operative association with an exit opening and conduit of the lawnmower apparatus to effect projection of the granular material in association with the exiting snow.

5 Claims, 5 Drawing Sheets

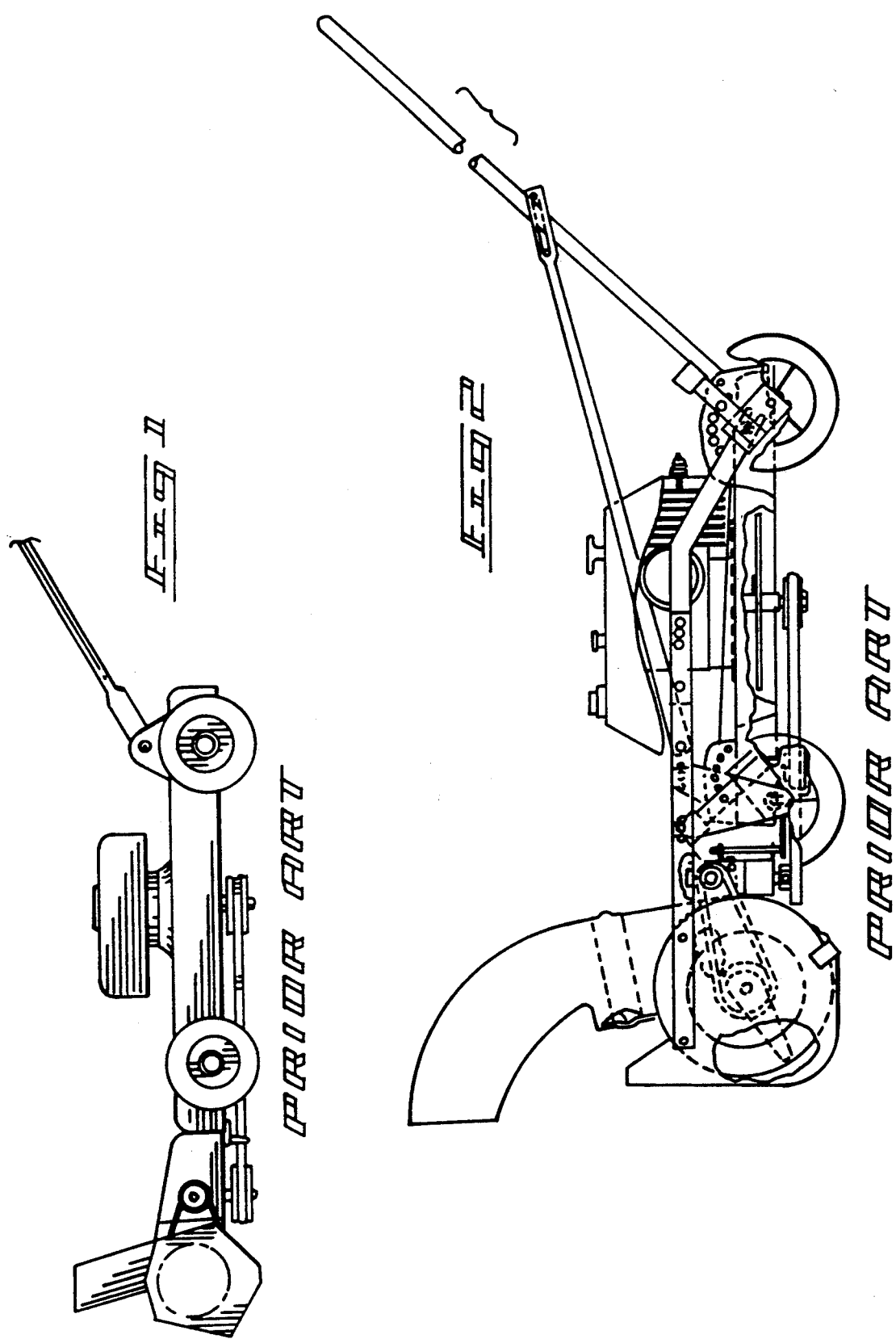

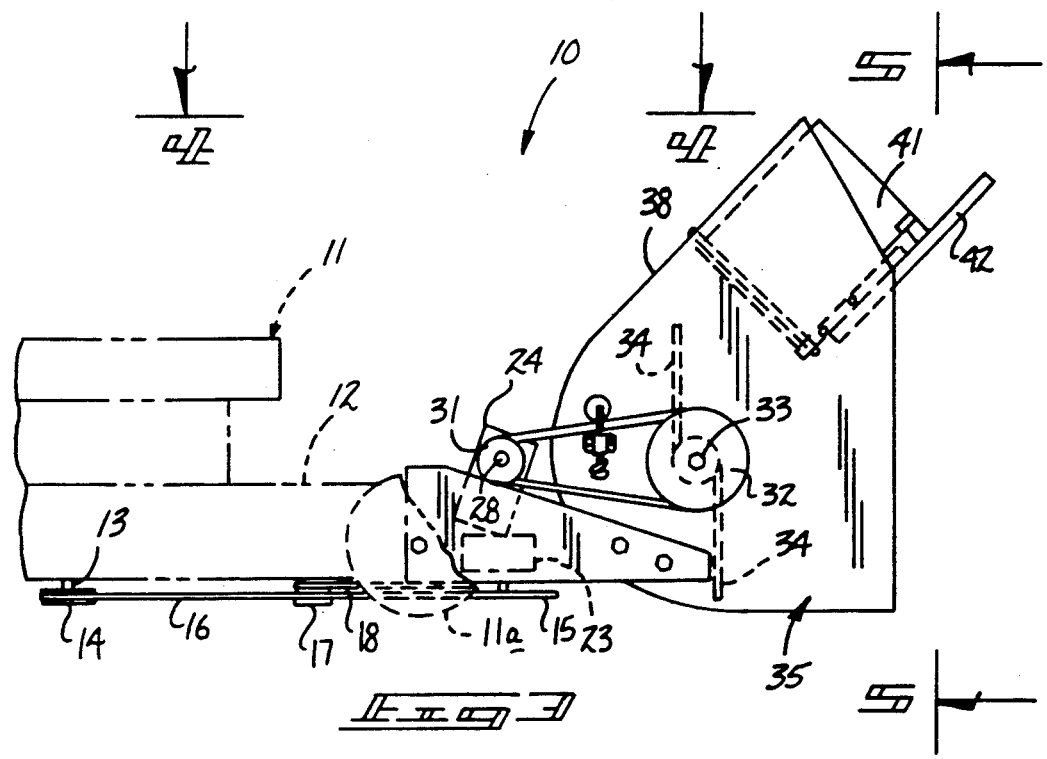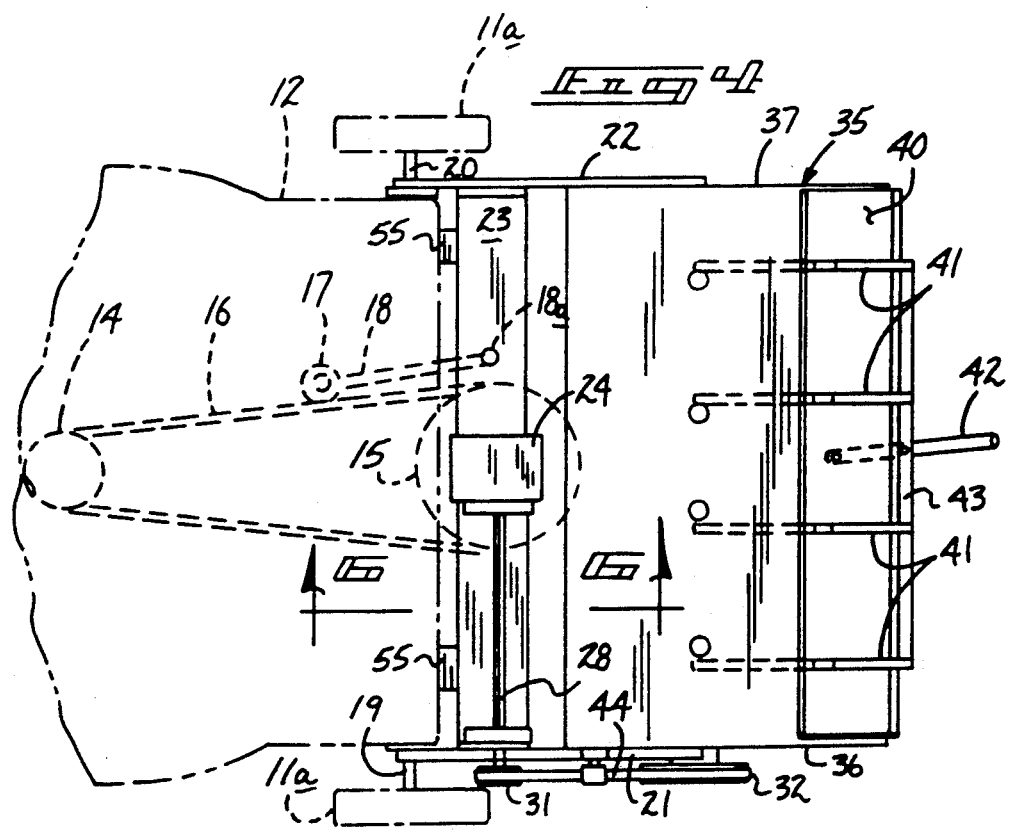

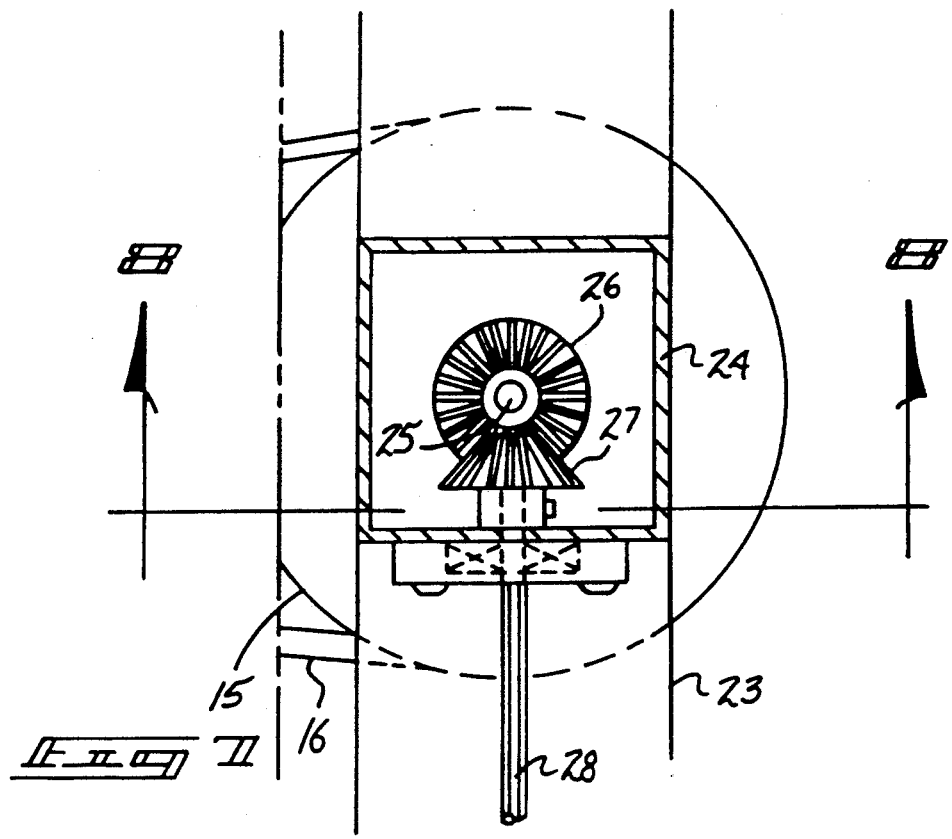
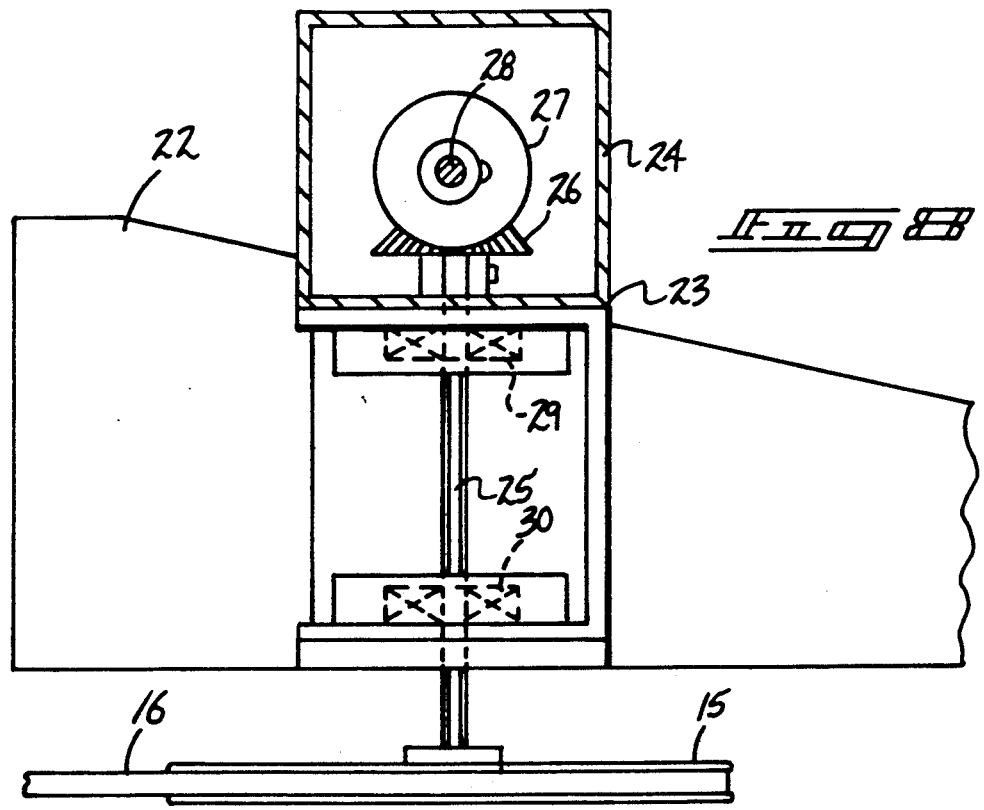

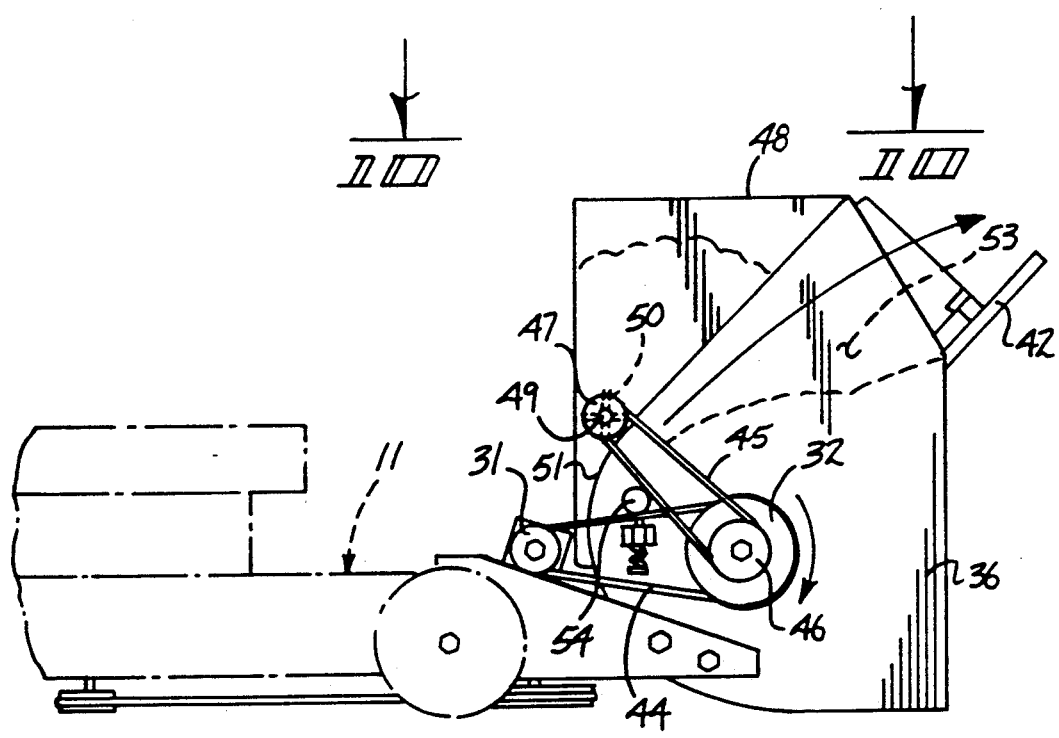
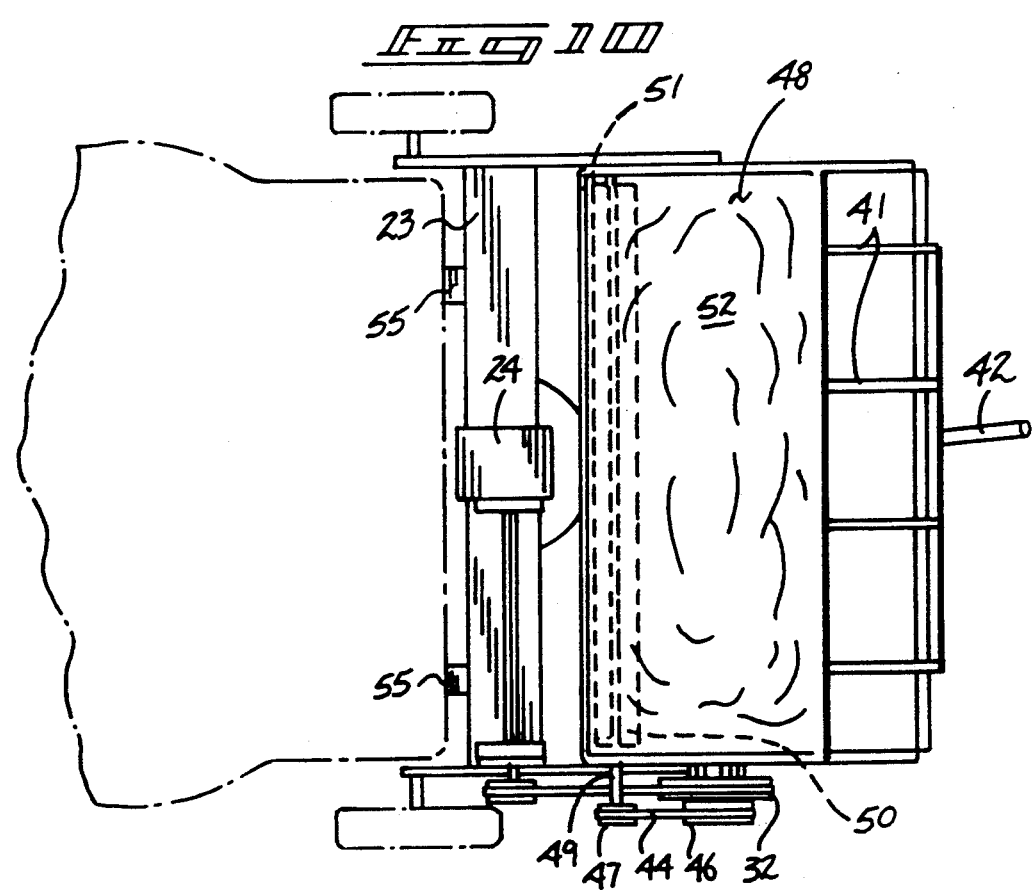

SNOWBLOWER AND LAWNMOWER APPARATUS

BACKGROUND OF THE INVENTION

1. Field of the Invention

The field of invention relates to snowblower apparatus, and more particularly pertains to a new and improved snowblower and lawnmower apparatus wherein the same is arranged for the selective mounting of a snowblower assembly forwardly of a lawnmower to effect operative use of a snowblower in association with a lawnmower assembly.

2. Description of the Prior Art

Due to expense and the cumbersome nature of lawnmower and snowblower apparatus, their combined usage and ownership by individuals is somewhat limited. Further, as snowblower usage is limited to a very few times of the year, the cost and ownership of such apparatus is difficult for many individuals.

While prior art structure has existed to include a snowblower apparatus in conjunction with a lawnmower structure, the effective and practical use of such structure is limited. Such prior art is exemplified in U.S. Pat. No. 4,104,812 to Stribiak, Jr. wherein a snowblower attachment is mounted to the forward end of a lawnmower utilizing plates extending from the forward and rear axles of the lawnmower member to mount the assembly to the forward end of the lawnmower.

U.S. Pat. No. 4,403,433 to Smith presents a lawnmower auxiliary structure as a further example of a lawnmower member mounting a snowblower member mounted thereto utilizing a drive pulley and belt arrangement.

U.S. Pat. No. 3,882,615 to Williams sets forth a combined snowblower and lawnmower structure providing a unit that may be converted from a lawnmower to snowblower usage.

U.S. Pat. No. 3,562,932 to Rautio sets forth a further example of a snowblower attachment for rotary lawnmowers.

As such, it may be appreciated that there continues to be a need for a new and improved snowblower and lawnmower apparatus as set forth by the instant invention which addresses both the problems of ease of use as well as effectiveness in construction in providing the ease of mounting a snowblower attachment to a forward end of a lawnmower and in this respect, the present invention substantially fulfills this need.

SUMMARY OF THE INVENTION

In view of the foregoing disadvantages inherent in the known types of snowblower conversion apparatus now present in the prior art, the present invention provides a snowblower and lawnmower apparatus wherein the same is arranged for the mounting to a forward end of a lawnmower structure. As such, the general purpose of the present invention, which will be described subsequently in greater detail, is to provide a new and improved snowblower and lawnmower apparatus which has all the advantages of the prior art conversion snowblower and lawnmower structure and none of the disadvantages.

To attain this, the present invention provides an attachment arranged for mounting to an associated lawnmower in an operative relationship to include a snowblower housing operative through a plurality of interrelated belts and pulleys to effect rotation of a plurality of impeller blades mounted within the snowblower housing. A drive pulley is mounted to a lower terminal end of the lawnmower motor output shaft to operatively effect the aforenoted rotation of the impeller structure. A modification of the invention includes a granular hopper in operative association with an exit opening and conduit of the lawnmower apparatus to effect projection of the granular material in association with the exiting snow.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved snowblower and lawnmower apparatus which has all the advantages of the prior art conversion snowblower and lawnmower apparatus and none of the disadvantages.

It is another object of the present invention to provide a new and improved snowblower and lawnmower apparatus which may be easily and efficiently manufactured and marketed.

It is a further object of the present invention to provide a new and improved snowblower and lawnmower apparatus which is of a durable and reliable construction.

An even further object of the present invention is to provide a new and improved snowblower and lawnmower apparatus which is susceptible of a low cost of manufacture with regard to both materials and labor, and which accordingly is then susceptible of low prices of sale to the consuming public, thereby making such snowblower and lawnmower apparatus economically available to the buying public.

Still yet another object of the present invention is to provide a new and improved snowblower and lawnmower apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an orthographic side view of a prior art snowblower attachment for a lawnmower.

FIG. 2 is an orthographic side view, partially in section, of a further example of a snowblower attachment to a lawnmower structure.

FIG. 3 is an orthographic side view of the instant invention.

FIG. 4 is an orthographic top view of the instant invention.

FIG. 7 is an orthographic view, taken along the lines 7—7 of FIG. 6 in the direction indicated by the arrows.

FIG. 8 is an orthographic view, taken along the lines 8—8 of FIG. 7 in the direction indicated by the arrows.

FIG. 9 is an orthographic side view of the invention mounting a granular discharge chute in association with the snowblower discharge chute.

FIG. 10 is an orthographic view, taken along the lines 10—10 of FIG. 9 in the direction indicated by the arrows.

DESCRIPTION OF THE PREFERRED EMBODIMENT

Figure 5:
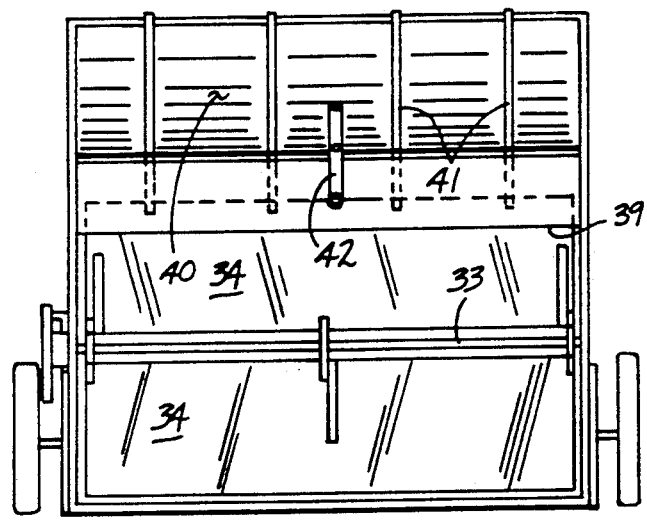
FIG. 5 is an orthographic frontal view of the instant invention.
Figure 6:
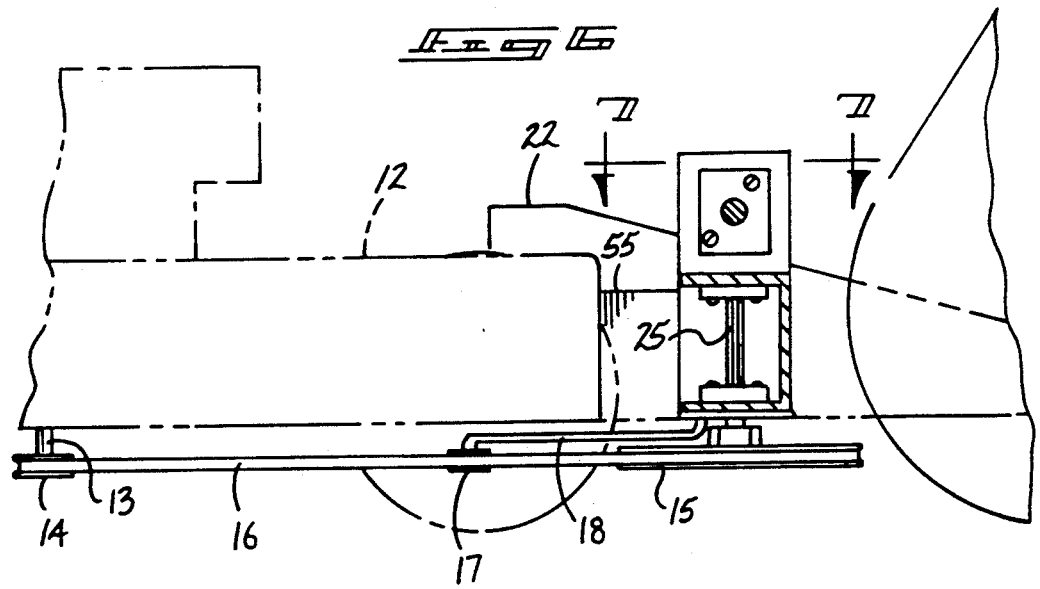
FIG. 6 is an enlarged orthographic side view, partially in section, taken along the lines 6—6 of FIG. 4 in the direction indicated by the arrows.

With reference now to the drawings, and in particular to FIGS. 1 to 10 thereof, a new and improved snowblower and lawnmower apparatus embodying the principles and concepts of the present invention and generally designated by the reference numeral 10 will be described.

FIGS. 1 and 2 are illustrative of prior art lawnmower members utilizing attaching snowblower structure, as exemplified in the U.S. Pat. Nos. 4,403,433 and 4,104,812 respectively utilizing various examples of belt drive organizations.

More specifically, the snowblower and lawnmower apparatus 10 of the invention essentially comprises a lawnmower 11 including a plurality of forward wheels 11a, as well as rear wheels, in a manner as typified in FIGS. 1 and 2 for example, wherein the forward wheels 11a include respective right and left wheels to include respective right and left front wheel axles 19 and 20 rotatably mounting the wheels, wherein the front right and left axles 19 and 20 are coaxially aligned and orthogonally directed through side walls of the lawnmower skirt in a conventional manner. The lawnmower deck mounts an associated lawnmower engine thereon to typically include a vertical output shaft 13 defined as a first shaft. The first shaft includes a drive shaft pulley mounted at a lower terminal end thereof, with a first continuous drive belt 16 wound about the drive pulley 14 and a first driven pulley 15 mounted forwardly of the drive pulley about a second shaft 25 arranged parallel to the first shaft 13. The second shaft 25, as well as the first driven pulley 15, are rotatably mounted and extending below a central housing 23 orthogonally mounted between respective right and left axle plates 21 and 22 that are arranged in a parallel relationship and mounted to the respective right and left front wheel axles 19 and 20. The second shaft 25 is rotatably mounted and aligned within respective upper and lower alignment bearings 29 and 30 within respective upper and lower ends of the central housing 23. An idler pulley 17 (see FIGS. 4 and 6 for example) is biased against the first continuous drive belt 16, with the idler pulley 17 mounted upon an idler pulley arm 18 that is pivotally mounted to a bottom surface of the central housing 23 to include a biasing spring 18a mounted to the housing and to the arm 18 to bias the arm against the first continuous drive belt 16 to maintain tension thereto.

The second shaft 25 is directed through the central housing 23 and into a gear drive housing 24 that is mounted to a top surface of the central housing 23, with a first bevel gear 26 mounted to the upper terminal end of the second shaft 25 in engagement with a second bevel gear 27, with the second bevel gear 27 mounted about a third shaft 28 orthogonally oriented relative to the second shaft 25. The third shaft 28 is directed along and spaced above the central housing 23 and terminates in a second driven pulley 31 positioned exteriorly of the right axle plate 21. A third driven plate 32 spaced from the second driven pulley 31 includes a fourth shaft 33 parallel to the third shaft 28. The fourth shaft 33 mounts a plurality of impeller blades 34 contained within an impeller blade housing 35, in a manner as illustrated in FIGS. 3, 4, and 5. The impeller blades may be of a planar diametrically aligned construction radially mounted about the fourth shaft 33, or alternatively may be of a screw-type construction to direct snow directed through and into the impeller blade housing 35 through an impeller blade housing entrance opening 39 through a front wall of the impeller blade housing 35. Further, to improve efficiency of the organization, it is understood that variations of the continuous belt structure, such as a belt 16 and the second continuous belt 44 mounted between the second and third pulleys 31 and 32 may be of a cog tooth arrangement as alternative to a smooth "V" belt structure. Further, interior surfaces of the impeller blade housing 35 are arranged to be coated with a smooth surface such as Teflon ® to enhance the directing of the snow therethrough.

The impeller blade housing 35 includes impeller blade housing right and left side walls 36 and 37 mounting the fourth shaft 33 therethrough. A top wall 38 of the housing 35 is arranged at a generally acute included angle relative to the front wall structure of the organization that includes the entrance opening 39, as well as an exit opening 40 positioned above the entrance opening and canted rearwardly relative to the entrance opening to project snow above the entrance opening, and including directional slots 41 to permit directing of the thusly projected snow in orientation laterally of the apparatus 10. Directional slots 41 include a control lever 42 mounted to a forward mounting bar 43 that pivotally mounts the forward ends of the slots 41, with rear ends of the slots 41 mounted rearwardly of the entrance opening 39 and within the exit conduit 53.

The FIGS. 9 and 10 illustrate the invention to include a granular receiving hopper 48 to include a sand, salt, or mixture of granular material 52 therewithin. To effect projection of the granular material in association with the snow directed through the exit opening, a fourth driven pulley 46 is coaxially mounted forwardly of the third driven pulley 32 cooperating with a fifth driven pulley 47 mounted to a hopper impeller shaft 49 directed through the granular receiving hopper 48 at a lower terminal end thereof adjacent a hopper exit slot 51 and spaced adjacent to and above that slot 51. A third continuous belt 45 is in operative association with the fourth and fifth driven pulleys 46 and 47 to effect rotation of the granular receiving hopper impeller shaft 49. A plurality of granular hopper impeller blades 50 are mounted about the granular hopper impeller shaft 49 to forcibly direct the granular material into the hopper exit slot 51. The hopper exit slot 51 is in communication with the exit conduit 53 to effect this mixture of the granular material with the exiting snow. It should be noted that a further tension pulley 54 is mounted to the impeller housing right side wall 36 and biased by a spring against the third continuous belt 45 to limit slack within that belt structure. Further, a plurality of resilient compressible spacer blocks 55 are mounted between the central housing 23 and the forward skirt of the lawnmower deck to align the housing relative to the lawnmower deck while permitting absorption of shock transmitted to the lawnmower deck during mounting and usage of the organization.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A snowblower and lawnmower apparatus for mounting to a lawnmower, wherein the lawnmower includes a lawnmower deck, the lawnmower deck mounting a lawnmower engine on the deck, with the lawnmower engine including a vertical output first shaft directed orthogonally through the deck, with the first shaft projecting below the deck, and the lawnmower deck including a perimeter skirt extending downwardly from the deck, wherein the skirt includes skirt respective right and left skirt side walls and a skirt forward wall, wherein the respective right and left skirt side walls include respective right and left wheels rotatably mounted to the respective right and left skirt side walls adjacent the skirt forward wall, wherein respective right and left skirt side walls include respective right and left wheel axles orthogonally directed into the respective right and left skirt side walls, wherein the right and left wheel axles are coaxially aligned relative to one another, and a drive pulley mounted at a lower terminal end of the first shaft, and a respective right and left axle plate mounted to the respective right and left wheel axle, wherein the right and left axle plates are arranged in a parallel relationship and extend forwardly of the skirt forward wall, and the axle plate includes a central housing integrally and orthogonally mounted between the right and left axle plates, wherein the central housing includes a second shaft arranged parallel to the first shaft extending orthogonally through the central housing and positioned below the central housing, wherein the second shaft includes a first driven pulley mounted at a lower terminal end of the second shaft, the first driven pulley and the drive pulley including a first continuous drive belt extending about the drive pulley and the first driven pulley, and a gear drive housing mounted fixedly and orthogonally to a top surface of the central housing, with the second shaft extending through the gear drive housing, the second shaft including a first bevel gear mounted to an upper terminal end of the second shaft, and a second bevel gear in operative association with the first bevel gear mounted within the gear drive housing, with the second bevel gear including a third shaft oriented orthogonally relative to the second shaft, with the third shaft extending parallel to and above the central housing and extending through the right axle plate, and a third shaft including a second driven pulley mounted to a distal end of the second shaft exteriorly of the right axle plate, and an impeller blade housing mounted forwardly of the central housing and extending fixedly and orthogonally between the right and left axle plate, and a third driven pulley fixedly secured to an outer distal end of a fourth shaft, wherein the fourth shaft is arranged parallel to the third shaft, and the impeller blade housing including an impeller housing right side wall and impeller housing left side wall, wherein the fourth shaft extends orthogonally through the impeller housing right side wall and the impeller housing left side wall, with the third driven pulley positioned exteriorly of the impeller housing right side wall and aligned with the second driven pulley, and including a second continuous belt directed about the second driven pulley and the third driven pulley, and the fourth shaft including a plurality of impeller blades mounted fixedly to the impeller shaft, with the impeller housing including a forward wall, with the forward wall including an entrance opening aligned with the impeller blades, and an exit conduit positioned above the impeller blades, with the exit conduit directed into an exit opening positioned above the entrance opening, wherein the impeller blades receive snow through the entrance opening and project the snow through the exit opening through the exit conduit, and a granular receiving hopper mounted to the impeller housing above the exit conduit, and the granular receiving hopper including a hopper exit slot formed at a lower end portion of the granular receiving hopper, wherein the hopper exit slot is in communication with the exit conduit, and the hopper exit slot includes a hopper impeller shaft mounted coextensively and above the hopper exit slot, the hopper impeller shaft including a plurality of hopper impeller shaft blades mounted coextensively to the impeller shaft, and the hopper impeller shaft directed laterally through the granular receiving hopper and including a fifth driven pulley mounted to an outer distal end of the hopper impeller shaft, and a fourth driven pulley mounted coaxially and forwardly of the third driven pulley, including a third continuous belt directed between the fifth driven pulley and the fourth driven pulley, wherein rotation of the fifth driven pulley effects rotation of the hopper impeller shaft and the hopper impeller shaft blades to project granular material into the exit conduit into association with snow directed through the exit conduit.

2. An apparatus as set forth in claim 1 including an idler pulley arm pivotally mounted to a bottom surface of the central housing, with the idler pulley arm extending rearwardly of the central housing below the lawnmower deck, with the idler pulley arm rotatably mounting an idler pulley, with the idler pulley in contiguous engagement with the first continuous drive belt to impart tension to the first continuous drive belt to enhance engagement between the drive pulley and the first driven pulley.

3. An apparatus as set forth in claim 2 wherein the exit conduit includes a plurality of spaced parallel directional slats pivotally mounted within the exit conduit, the direction slats extending forwardly of the exit opening and pivotally mounted to a mounting bar, the mounting bar including a control lever extending forwardly of the mounting bar, wherein pivotment of the control lever effects pivotment of the directional slats to project the snow laterally of the impeller housing.

4. An apparatus as set forth in claim 3 including a further tension pulley in contiguous engagement with the third continuous belt, with spring means mounted to the further tension pulley and to the impeller housing right side wall to bias the further tension pulley against the third continuous belt.

5. An apparatus as set forth in claim 4 including a plurality of resilient compressible spacer blocks mounted to a rear wall of the central housing in contiguous engagement between the central housing and the skirt forward wall to effect shock absorbing characteristics to the lawnmower deck when the central housing is mounted forwardly of the impeller lawnmower deck.

* * * * *